Patented Aug. 16, 1932

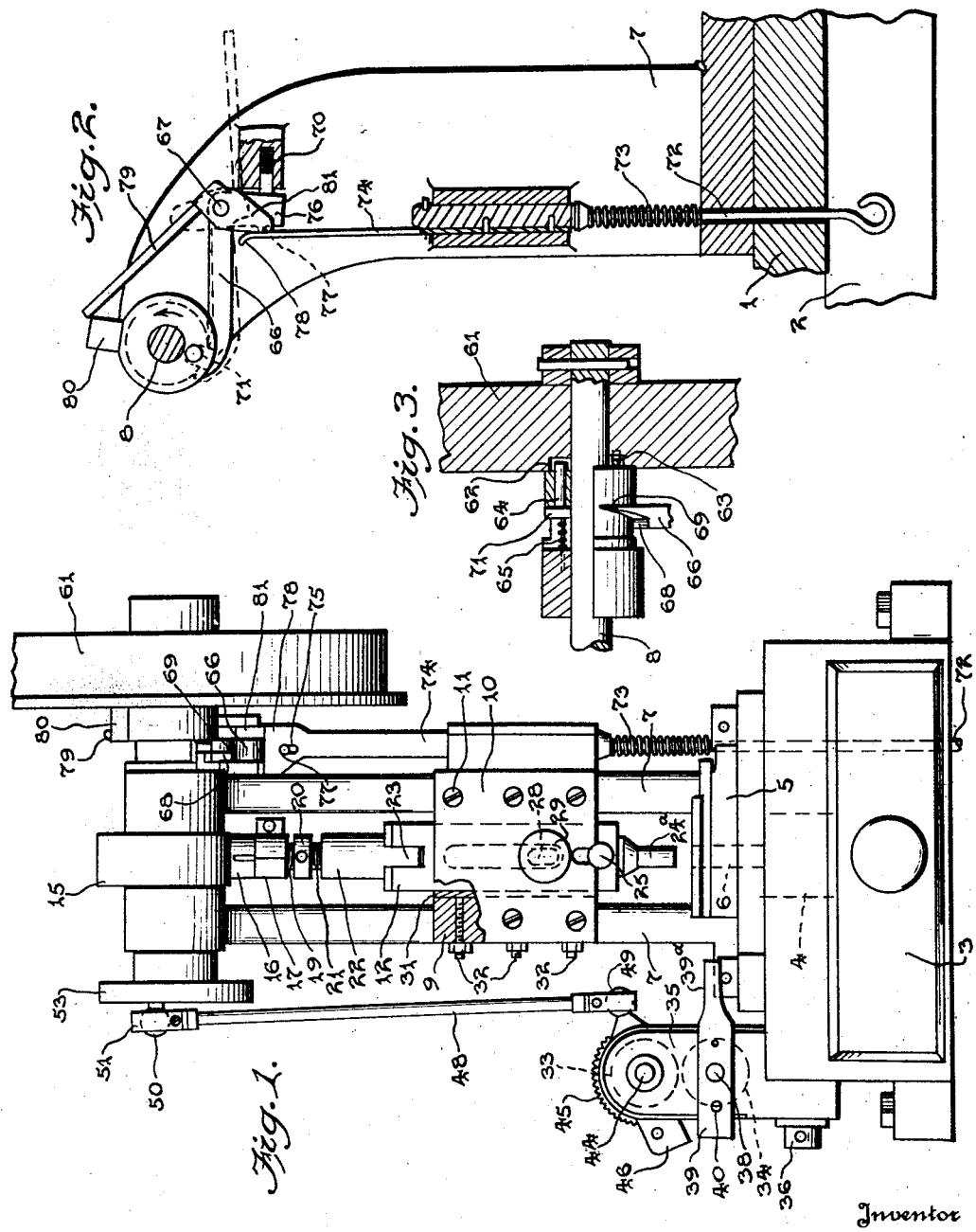

1,872,132

UNITED STATES PATENT OFFICE

JOHN A. FALLESON, OF ROCHESTER, NEW YORK, ASSIGNOR TO UNION TOOL COMPANY, A COPARTNERSHIP COMPRISING JOHN A. FALLESON AND PAUL S. PAULSON

NONREPEAT MECHANISM FOR POWER PRESSES

Application filed October 4, 1928. Serial No. 310,293.

The present invention relates to non-repeat mechanism for power presses and an object thereof is to provide a novel construction which will automatically effect the stopping of the punch after each punching operation.

To this and other ends, the invention consists of certain parts and combinations of parts, all of which will be hereinafter described: the novel features being pointed out in the appended claims.

In the drawing:

Fig. 1 is a front elevation of the punch press;

Fig. 2 is a detail view of the stop clutch partially in section; and

Fig. 3 is a detail sectional view of the stop clutch in the direction of the axis of turning of the two clutch members.

Referring to the illustrated embodiment, 1 indicates the base frame on which the punch press is supported.

Supported on the base frame 1 is an upright frame 7 having a forwardly projecting upper portion in which the shaft 8 of the punch press turns. Below the overhanging upper portion a guide 9 is provided on the upright frame having a removable front plate 10 secured in place by screws 11. Operating in this guide is a slidable punch carrier 12. This punch carrier is operated, in this instance, through an eccentric keyed to the shaft 8 and surrounded by a ring 15 which has a split sleeve 16 projecting therefrom and internally threaded to engage a right hand screw threaded portion 19 of a screw threaded member 20. The left hand screw threaded portion 21 of this member is engaged in an internally threaded socket 22 of a member 23 which is pivoted to the sliding punch carrier 12.

On the lower end of the punch carrier is arranged a punch 24ª which is secured in place by a set screw 25.

The machine is driven through a drive wheel 61 mounted on the shaft 8. This drive wheel is mounted to turn loosely on the shaft 8 and is adapted to be connected with the shaft through a stop clutch which automatically releases the shaft on each complete rotation of the shaft.

The stop clutch is formed, in this instance, by an annular slot 62 in one face of the driving member 61 and having a pin 63 against which one end of a sliding clutch device 64 is adapted to rest. This sliding clutch device is mounted on the shaft 8 normally pressed or urged toward the driving member 61 by a spring 65. For effecting the movement of the sliding clutch device 64 out of clutching connection with the driving member, there is provided a clutch operator 66 in the form of a lever pivoted at 67 to the upstanding portion 7 of the frame. The forward end of this operator has a stop shoulder 68 and an inclined or bevelled portion 69 leading to the stop shoulder. A spring 70 normally urges the operator 66 toward the clutch device 64 so that the laterally projecting portion 71 of the clutch device may engage the bevelled or shifting portion 69 and the clutch device will be withdrawn against the action of the spring 65 from connection with the driving member 61, the projection 71 eventually coming to rest against the stop portion 68. When the operator 66 is shifted against the action of the spring 70, the clutch device 64 is released and projected toward the driving member 61 so that when the pin 63 in the driving member turns to a point opposite the clutch device 64, the latter will engage said pin and the driven shaft 8 will become connected with the driving member 61, and the shaft 8 will turn until the detent or clutching device 64 is again shifted by the operator 66.

A means for moving the operator 66 is provided and has a breakable connection with the operator. This means, in this instance, comprises a pull rod 72 guided on the frame and operated preferably by a pedal (not shown) to depress the rod against the action of a spring 73. This rod 72 carries in its upper end a laterally deflectable portion 74 provided with a slot or opening 75. On an arm 76 projected from the operator 66 is a pin 77 adapted to engage within the opening 75 of the laterally deflectable portion 74. The upper end of the laterally deflectable portion 74 is bevelled at 78 so that when the pull bar or rod 72 rises under the action of the spring 73, the deflected end 78 will engage the projection 77 and ride over the same until the slot 75 is reached, when the projection will enter and the breakable connection will be established between the operator 66 and the means for shifting said operator. When the treadle (not shown) is depressed, the rod 72 will pull down on the operator 66 and effect the release of the movable clutching device 64.

For breaking the connection between the operator 66 and the shifting means therefor, while the pedal is still depressed, and before the portion 71 of the movable clutch device 64 has made a complete revolution, a connection breaking means is provided, comprising, in this instance, a lever 79 pivoted at 67 and adapted to be engaged by a projection 80 turning with the shaft 8. This connection breaker has an arm 81 which, when the arm 79 is shifted by the projection 80 to engage the laterally deflectable connection 74 and move the latter to cause it to disengage with the projection 77 so that the operator 66 may move back into the path of the projection 71 of the movable clutch device 64 under the action of the spring 70 before the rod 72 is released by the pedal to the action of the spring 73.

The operation of the invention will be understood from the foregoing but it may be summarized as follows: The treadle (not shown) is depressed to pull downwardly on the rod 72. The downward pull on the rod causes the operator 66 to be depressed thereby freeing the clutch device 64 for engagement with the driving member 61. The shaft 8 now turns causing the punch 24 to descend. Shortly before the punch reaches stop position, a projection 80 will engage the connection breaker 79 and cause the latter to shift the deflectable portion 74 out of engagement with the operator 66, permitting the latter to move into the path of the detent or movable clutch device 64 causing the breaking of the connection between the driving member 61 and the driven member 8, the movable clutch device 64 eventually coming to rest against the stop 68. With the release of the treadle operated rod 72, the deflected portion 74 re-engages with the projection 77 so that the machine is ready for another operation.

What I claim as my invention and desire to secure by Letters Patent is:

1. The combination with a driving member and a driven member, of a movable clutch element connected to the driven member and adapted to be moved into and out of connection with the driving member, means normally urging said movable clutch element into connection with the driving member, a member having a clutch shifting surface thereon and a stop at the end of said clutch shifting surface for engaging the movable clutch element to shift the later out of connection with the driving member and thereafter to stop the rotation of the driven member, means normally holding said shifting and stop carrying member in operative position, means for operating said shifter and stop carrying member to an inoperative position so that the movable clutch element may move into connection with the driving member, said operating means having a laterally flexible portion movable to break the connection between the operating means and the shifter and stop carrying member, a two armed lever having one arm adapted to cooperate with said laterally flexible portion, and means carried by the driven member for cooperating with the other arm of said two arm lever to shift said two armed lever in order to move the laterally flexible portion so as to break connection between the operating means and the shifting and stop carrying member.

2. The combination with a driving member and a driven member, of a movable clutch element connected with the driven member and adapted to be moved into and out of connection with the driving member, means normally urging said movable clutch element into connection with the driving member, a shifter for moving the movable clutch element out of engagement with the driving member, means normally holding said shifter in operative position, a pull rod for operating said shifter to move it to inoperative position so that the movable clutch element may move into connection with the driving member, said pull rod having a laterally flexible portion with a breakable connection with the shifter, and a two armed lever having one arm engaging the laterally flexible portion to break connection with the shifter and the other arm controlled by the driven member.

JOHN A. FALLESON.